United States Patent [19]

Nakajima et al.

[11] Patent Number: 5,041,334

[45] Date of Patent: Aug. 20, 1991

[54] PIGMENT-ATTACHED PHOSPHOR

[75] Inventors: Shoji Nakajima; Masahiro Yoneda, both of Anan, Japan

[73] Assignee: Nichia Kagaku Kogyo K.K., Anan, Japan

[21] Appl. No.: 452,629

[22] Filed: Dec. 19, 1989

[30] Foreign Application Priority Data

Aug. 25, 1989 [JP] Japan .................................. 1-218841

[51] Int. Cl.$^5$ ........................ C08L 89/00; C09K 11/02
[52] U.S. Cl. .................... 428/407; 252/301.33;
 252/301.36; 252/301.4 R; 428/403; 428/917;
 524/22; 524/211; 524/437; 525/498
[58] Field of Search ...................... 428/403, 407, 917;
 252/301.36, 301.4 R, 301.33, 301.34; 313/467;
 427/66, 67, 68; 524/22, 211, 437, 441, 442, 498,
 904; 525/54.1, 498; 530/354

[56] References Cited

U.S. PATENT DOCUMENTS

| | | |
|---|---|---|
| 1,732,533 | 10/1928 | Redman .......................... 524/22 X |
| 2,133,335 | 10/1938 | Wilson et al. ...................... 524/22 X |
| 2,585,967 | 2/1952 | Schibler ............................ 524/22 X |
| 3,881,941 | 5/1975 | Kernohan ............................ 106/20 |
| 3,886,394 | 5/1975 | Lipp .................................. 427/68 X |
| 4,021,588 | 5/1977 | Royce et al. ......................... 427/215 |
| 4,049,845 | 9/1977 | Lozier et al. ........................... 427/68 |
| 4,172,920 | 10/1979 | Kanda et al. ........................, 428/403 |

Primary Examiner—George F. Lesmes
Assistant Examiner—Christopher Brown
Attorney, Agent, or Firm—Nixon & Vanderhye

[57] ABSTRACT

A pigment-attached phosphor in which pigment particles are attached to the surfaces of phosphor particles by a binder, the binder being 0.01 to 1.0 parts by weight and preferably 0.05 to 0.80 parts by weight of gelatin and 0.01 to 0.5 parts by weight and preferably 0.02 to 0.40 parts by weight of urea resin, all against 100 parts by weight of phosphor, the weight ratio of the gelatin and urea resin being within a range of 1:1 to 10:1 and preferably 1:1 to 8:1. The gelatin and urea resin ensure a strong and better attachment of the pigment particles to the surfaces of the phosphor particles.

11 Claims, 1 Drawing Sheet

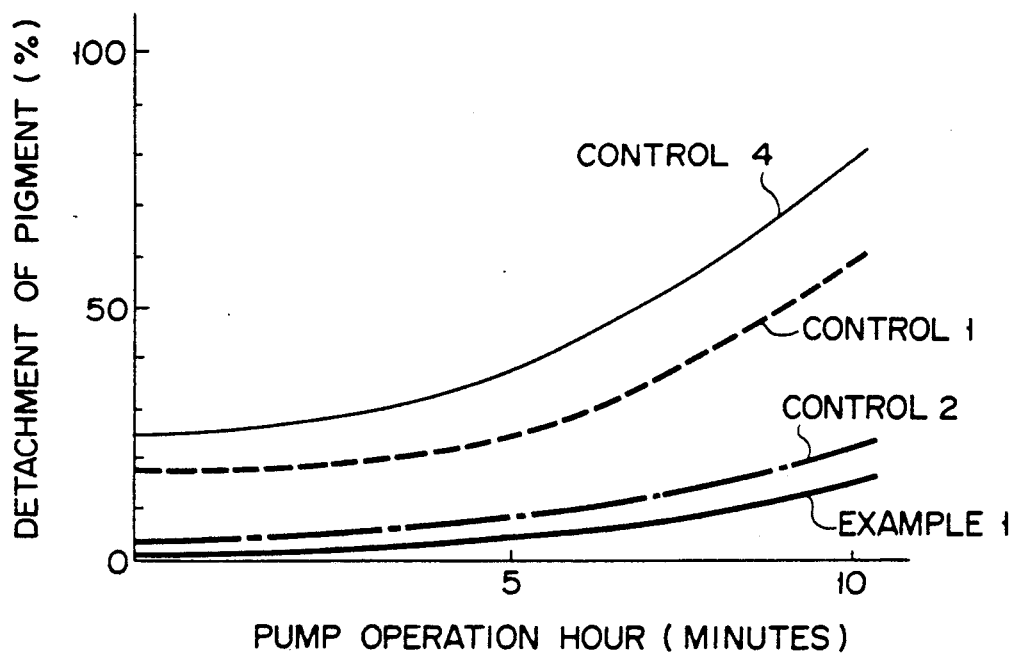
F I G. 1
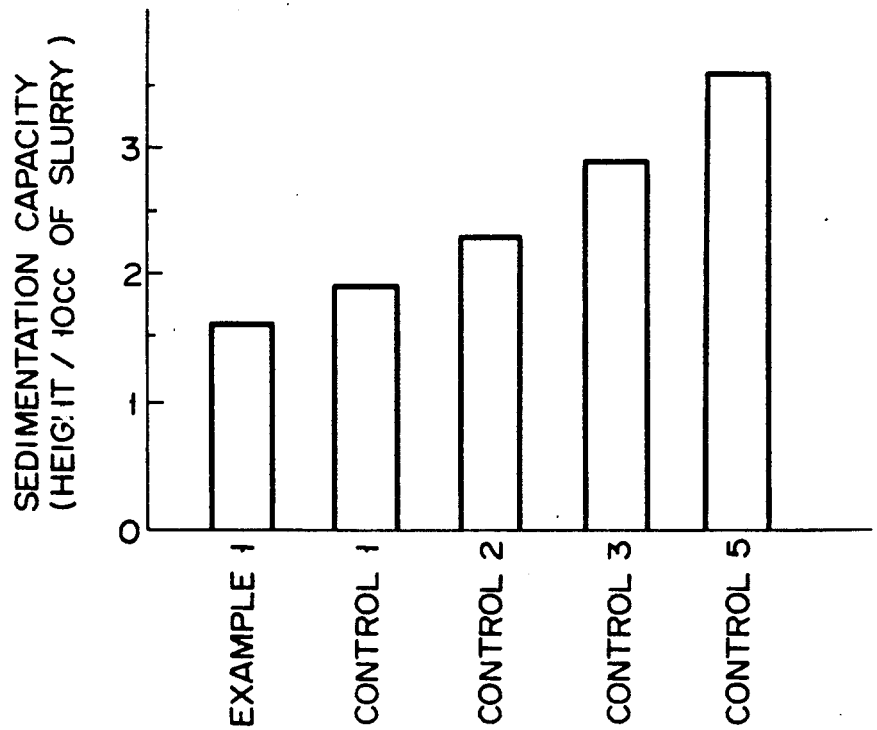
F I G. 2

PIGMENT-ATTACHED PHOSPHOR

Background of the Invention

1. Field of the Invention

The present invention relates to a pigment-attached phosphor.

2. Description of the Related Art

In order to improve a contrast of displayed image on the screen of a color CRT, a pigment-attached phosphor has been employed on the phosphor screen of the color CRT. In this case, as the pigment, use has been made of such a type as to allow transmission of desirable light emitting from the phosphor and absorption of the other visible light. A high-contrast image can really be achieved by using such a pigment-attached phosphor, but various drawbacks have been encountered in comparison with a pigment-free phosphor. If, for example, a slurry containing the pigment-attached phosphor is used in the manufacture of a color CRT, pigment particles are liable to be detached from the surfaces of phosphor particles because of their inadequate force of attachment to the phosphor particles. The detached pigment particles cause a fall in colorimetric purity and brightness on the screen of the color CRT. Further, no homogeneous phosphor film can be obtained because of an inadequate dispersion of phosphor particles in the slurry.

These problems are partly due to a binder by which pigment is attached to the phosphor particles. Various types of binders have thus a been developed, such as a type containing acrylic resin (see Japanese Patent Disclosure (KOKAI) No. 52-109488) and a type containing a combination of gelatin and gum arabic (Japanese Patent Disclosure (KOKAI) No. 53-50880). However, the binder containing the acrylic resin is poor in dispersion of phosphor particles. The problem with the binder containing gelatin and gum arabic is that the pigment is poor in its attachment to the phosphor particles.

SUMMARY OF THE INVENTION

One object of the present invention is to provide an improved pigment-attached phosphor which ensures a better attachment of pigment to phosphor and a better dispersion of phosphor particles in a slurry.

Another object of the present invention is to provide an improved pigment-attached phosphor which ensures a high-contrast color CRT without impairing its colorimetric purity and its brightness.

According to the present invention, there is provided a pigment-attached phosphor in which pigment particles are attached to the surfaces of phosphor particles by a binder, the binder being 0.01 to 1.0 parts by weight and preferably 0.05 to 0.80 parts by weight of gelatin and 0.01 to 0.5 parts by weight and preferably 0.02 to 0.40 parts by weight of urea resin, all against 100 parts by weight of phosphor, the weight ratio of the gelatin and urea resin being within a range of 1:1 to 10:1 and preferably 1:1 to 8:1.

The pigment-attached phosphor of the present invention uses a combination of gelatin and urea resin as a binder. The combination of gelatin and urea resin ensures a strong and better attachment of the pigment particles to the surfaces of the phosphor particles. This phosphor prevents a fall in color purity and brightness of the image on the screen of a color CRT, which might otherwise occur due to the detachment of pigment particles from phosphor particles. A slurry prepared using such a phosphor ensures a better dispersion of the phosphor particles in the slurry. If the phosphor of such an excellent dispersion is employed, then it is possible to readily obtain a phosphor film having uniformly dispersed phosphor particles. Hence, a high-contrast, high-brightness level color CRT can be obtained by producing a phosphor screen using the pigment-attached phosphor of the present invention.

BRIEF DESCRIPTION OF THE DRAWINGS

FIG. 1 is a graph showing a relation of the detachment rate of pigment from phosphor to a pump operation time in Examples of the present invention and in Controls; and FIG. 2 is a graph showing a sedimentation volume in Example of the present invention and in Controls.

DETAILED DESCRIPTION OF THE PREFERRED EMBODIMENTS

In the phosphor according to the present invention, pigment particles are attached to phosphor particles by gelatin and urea resin.

As the pigment, use can be made of a pigment used for an ordinary pigment-attached phosphor, for example, a blue pigment such as a cobalt blue and ultramarine blue, a green pigment such as $TiO_2$-$ZnO$-$CoO$-$Al_2O_3$ and $TiO_2$-$ZnO$-$CoO$-$NiO$, a red iron oxide ($Fe_2O_3$) and a yellow iron oxide ($a$-$Fe_2O_3 \cdot H_2O$).

As the phosphor, use can be made of an ordinarily employed phosphor, such as the phosphors ZnS:Ag, ZnS:Cu.Au.Al, ZnS:Cu.Al, $Y_2O_2S$:Eu and $Y_2O_3$:Eu.

The gelatin is one type of derived protein obtained by boiling collagen in water and irreversibly transforming it into a water-soluble one, and has a molecular weight of about a hundred thousand. The gelatin has widely been used for a food such as confectionery, for a photosensitive film for photographing, for a capsuled drug or for an industrial adhesive. If the gelatin is used for adhesives, for example, its peptide chains are shortened upon heating to prevent re-gelation, a water-soluble, irreversible gel is formed upon adding formalin to the gelatin, or the gelatin particles are micro-capsuled upon the action of gum arabic thereon. The gelatin is classified, for example, into an alkalitreated one, an acid-treated one and glue, depending upon a difference in a raw material used or in a method for manufacturing the same. Any gelatin thus manufactured can preferably be employed in the pigment-attached phosphor of the present invention.

The urea resin employed is one obtained through a condensation reaction of urea and formaldehyde. The urea resin is cured upon addition of a salt such as ammonium chloride, ammonium sulfate, or ammonium acetate to the urea resin, and reveals a bonding action. Thus the urea resin can be used as a binder for paints and paper, as a fiber-working agents, as an adhesive for plywood and wooden products and so on. As the urea resin, use can be made of monomers, polymers, urea-resin polymer emulsions or the co-condensates such as urea-melamine, urea-phenol and urea-melamine-phenol, and so on.

In order to attach the pigment to the phosphor, proposals have been made to use gelatin-based or acrylic-based adhesives which have actually been employed in the art. However, the joint use of gelatin and urea resin has not be known up to this date. It has been found by the inventors that the joint use of the gelatin and urea resin leads to an marked improvement in the attachment of the pigment to the phosphor and in the dispersion of phosphor particles.

To 100 parts of the phosphor are added, 0.01 to 1.0 parts by weight, or preferably 0.05 to 0.80 parts by weight, of gelatin and 0.01 to 0.5 parts by weight, or preferably 0.02 to 0.40 parts by weight, of urea resin. For the gelatin and/or urea resin being less than 0.01 parts by weight, the pigment is liable to be detached from the phosphor due to its inadequate force of adhesion to the phosphor. For the gelatin exceeding 1.0 parts by weight and/or the urea resin exceeding 0.5 parts by weight, the dispersion of a pigment-attached phosphor in a slurry is lowered because of a strong cohesion among phosphor particles. Further, according to the present invention, a blend weight ratio of the gelatin and urea resin falls within a range of 1:1 to 10:1, preferably, 1:1 to 8:1. Table 1 below shows the attachment of the pigment to the phosphor and dispersion of the phosphor when the blend weight ratio between the gelatin and the urea resin varies.

TABLE 1

| | Gelatin | urea resin | attachment of pigment | dispersion of phosphor |
|---|---|---|---|---|
| 1 | 0.05 | 0.005 | x | Δ |
| 2 | 1 | 0 | Δ | o |
| 3 | 0 | 1 | Δ | Δ |
| 4 | 0.25 | 0.5 | Δ | x |
| 5 | 0.5 | 1 | Δ | Δ |
| 6 | 1.5 | 0.3 | Δ | x |
| 7 | 1 | 1 | o | o |
| 8 | 2 | 1 | o | o |
| 9 | 10 | 1 | o | o |
| 10 | 15 | 1 | Δ | Δ |

In Table 1 above, marks o, Δ and x represent "better", "somewhat bad" and "bad", respectively.

As evident from Table 1, the attachment of the pigment to the phosphor and dispersion of the phosphor particles are not better if the blend weight ratio between the gelatin and the urea resin is outside a range of 1:1 to 10:1.

The amount of pigment attached to the phosphor against an amount of gelatin-urea resin binder is preferable if 0.5 to 3.0 parts by weight of blue pigment and 0.5 to 3.0 parts by weight of green pigment are added to 100 parts by weight of the phosphor, respectively, and if 0.05 to 0.3 parts by weight of red pigment, such as red iron oxide, are added to 100 parts by weight of the phosphor. Further, adequate contrast is difficult to obtain on the CRT screen if less than 0.5 parts by weight of the blue pigment and green pigment are so added, respectively, and if less than 0.05 parts by weight of red pigment are so added. On the other hand, the brightness is liable to be lowered on the CRT screen if the blue pigment and green pigment to be added exceed 3.0 parts by weight and if the red pigment to be added exceeds 0.3 parts by weight.

The particle size of the pigment which is used in the present invention may be a particle size of normally 0.01 to 1 $\mu m$. On the other hand, the particle size of the phosphor which is used in the present invention may be normally 2 to 14 $\mu m$ and, preferably, 4 to 10 $\mu m$.

Further, the pigment-attached phosphor of the present invention can be manufactured using an ordinary method. For example, phosphor according to the present invention can be obtained by preparing a water suspension containing pigment, 100 parts by weight of phosphor, 0.01 to 1.0 parts by weight of gelatin and 0.01 to 0.5 parts by weight of urea resin with a blend weight ratio of the gelatin and urea resin being within a range of 1:1 to 10:1, separating a flocculate from the water suspension and drying it upon heating.

As a solvent for the water suspension, use can be made of, for example, water, alcohol such as methanol and ethanol, or a water/alcohol mixture.

Upon carrying out the aforementioned drying step at 150° to 200° C., it is possible to obtain a pigment-attached phosphor whose pigment particles are high in attachment and whose phosphor particles are better in dispersion. At less than 150° C, the pigment particles may be inadequate in their attachment to the phosphor particles and phosphor particles may be poor in their dispersion, whereas at a temperature exceeding 200° C. the gelatin and urea resin have a tendency toward thermal degradation and thermal discoloration, causing a fall in attachment of pigment particles to phosphor particles and in dispersion of phosphor particles. It is preferable to perform a flow-drying step as the drying step so as to prevent cohesion among the phosphor particles.

Further, in order to enhance cohesion of the gelatin, urea resin and pigment particles to the surface of phosphor particles and hence prevention of cohesion among the phosphor particles and a uniform dispersion of the phosphor particles, it is possible to add potassium silicate, colloidal silica, P04, Al compound, Zn compound, Mg compound Al oxide, Zn oxide, Mg oxide or the mixture thereof to the water suspension.

The present invention will be explained in more detail below in conjunction with Examples.

First the measuring method will be explained below in conjunction with the present examples.

MEASUREMENT OF PIGMENT'S DETACHMENT

The detachment of pigment particles is measured by repeatedly circulating pigment-attached phosphor through a snake pump. First, 100 cc phosphor coating slurry of water, polyvinyl alcohol (PVA), ammonium dichromate and to-be-measured pigment-attached phosphor blended in 2.1:0.06:0.004:1 ratio by weight is poured into a beaker which is connected to the suction and delivery sides of the snake pump. The pump is operated for a predetermined period of time to allow the phosphor slurry to circulate therethrough in a flow rate of 1 l/min. Then the phosphor slurry is introduced into a sedimentation tube to allow those pigment particles which ar detached from the surfaces of the phosphor particles to be settled. The settled pigment particles are analyzed to determine an amount of pigment detached from the phosphor particles. For the pigment cobalt blue ($CoO \cdot nAl_2O_3$), for example, an amount of pigment detached from the phosphor surface can be evaluated in terms of an amount of cobalt analyzed. It is to be noted that the snake pump used for measurement is actually used to supply the phosphor coating slurry to a phosphor formation surface in the step of manufacturing a color CRT.

MEASUREMENT OF SEDEMENTATION VOLUME OF PHOSPHOR

A sedimentation volume of phosphor particles is measured for the evaluation of their dispersion and hydrophilicity. In this case, 10 cc of the same phosphor coating slurry as that used for the measurement of the detached pigment is introduced into a graduated sedimentation tube 10 mm in internal diameter to allow it to stand until the phosphor particles in the slurry are settled to the full. The level to which the phosphor particles settle on the bottom of the tube is measured to determine a sedimentation volume. If the phosphor particles are uniformly dispersed under a better hydrophilic condition, they do not form a flocculate and hence the sedimentation volume is lowered in a denser form of sedimentation. If, on the other hand, the phosphor particles are poor in dispersion and hydrophilicity, they are settled into a flocculate and the sedimentation volume is increased.

Examples of the present invention will be explained in more detail below. The gelatin used in the Examples is an alkali-treated one.

EXAMPLE 1

A water suspension was prepared from 100 g of the pigment cobalt blue, 5 Kg of ZnS:Ag blue phosphor, 10 g of gelatin and 5 Kg of Uloid (a urea resin manufactured by Mitsui Toatsu Chemical, Inc.) with 5 g of colloidal silica and Al $(NO_3)_3$ added to the water solution to an extent that Al reached 500 ppm in the water suspension. The water slurry thus prepared was adjusted to a pH of 7.0 with NaOH added thereto and a coating material was separated from the water slurry, washed with water and flow-dryed at 150° C. to obtain a pigment-attached phosphor.

The detachment of the pigment was measured using the phosphor thus obtained. The result of measurement is as shown in FIG. 1. As appreciated from the graph in FIG. 1, the detachment of the pigment is 6% for 15 minutes and 15% for 10 minutes, revealing an excellent attachment of the pigment to the surfaces of the phosphor particles.

Further, the phosphor was also measured for sedimentation level and found that the sedimentation level was as low as 6 cm, an excellent dispersion of the phosphor particles.

CONTROLS 1, 2

The detachment of the pigment was measured for a conventional pigment-attached phosphor (Control 1) using gelatin and gum arabic as a binder and for a pigment-attached phosphor (Control 2) using acrylic resin, in the same way as in Example 1. The result of measurement is as shown in the graph of FIG. 1. As appreciated from FIG. 1, the detachment of the pigment from the phosphor in Control 1 and 2 is 25%, 9% for 5 minutes and 60%, 20% for 10 minutes, these percentages being higher than that of Example 1, respectively. From FIG. 1 it will be understood that, in the pigment-attached phosphor of the present invention, pigment particles are not liable to be detached from the phosphor particles in comparison with the conventional pigment-attached phosphor.

The sedimentation level was measured in Controls 1 and 2, the results of which are shown in FIG. 2. As seen from FIG. 2, the sedimentation levels of the phosphor particles are 1.9 cm and 2.3 cm, respectively, these levels being higher than that in Example 1. From the graph of FIG. 2 it will be found that the phosphor particles of Example 1 are excellent over the conventional phosphor particles in terms of their dispersion and hydrophilicity.

CONTROLS b 3, 4, 5

Three kinds of water suspension were prepared from 100 g of the pigment cobalt bue, 5 Kg of ZnS:Ag blue phosphor, 75, 2.5, 12.5 g of gelatin and 15, 0.25, 25 g of Uloid (urea resin manufactured from Mitsui Toatsu Chemical, Inc.) to obtain pigment-attached phosphors (Control 3, Control 4, Control 5) in the same way as in Example 1.

In Control 3, a gelatin content is outside a range set forth in the present invention. The phosphor particles are high in their cohesion and, upon being incorporated into a slurry, poor in their dispersion, forming a gathered mass, a state not suitable from a practical viewpoint. The sedimentation level was measured for the three phosphors, the results of which are as shown in FIG. 2. As appreciated from FIG. 2, the sedimentation levels of Controls 3 and 5 are 2.9 cm and 3.6 cm, respectively.

In Control 4, the content of the urea resin in outside a range set forth in the present invention. In Control 4, the attachment of the pigment particles to the surfaces of the phosphor particles is weak and the pigment particles are massively detached from the surfaces of the phosphor particles when the slurry is produced and the slurry is circulated in a coating device. The detachment of the pigment is measured against the phosphor obtained, the result of which is as shown in FIG. 1. As shown in FIG. 1, the detachment of the pigment is 39% for 5 minutes and 77% for 10 minutes, both of which are in a bad condition.

Examples 2 to 10 of pigment-attached phosphors according to the present invention will be explained below, but the present invention is not restricted to the Examples as set out above or below.

EXAMPLE 2

A coating material was obtained in the same method as in Example 1 except that a water suspension contained 100 g of the pigment cobalt blue, 5 Kg of ZnS:Ag phosphor, 15 g of gelatin and 5.5 g of Uloid. The coating material was flow-dried at 180° C. to obtain a pigment-attached phosphor. The pigment-attached phosphor thus obtained revealed the same good characteristic as in Example 1.

EXAMPLE 3

A coating material was obtained in the same method as in Example 1, except that a water suspension contained 50 g of the green pigment $TiO_2$-ZnO-CoO-$Al_2O_3$, 5 Kg of ZnS:Cu·Au·Al phosphor, 8 g of gelatin and 5 g of Uloid. The coating material was flow-dried at 160° C. to obtain a pigment-attached phosphor. The pigment-attached phosphor manifested the same good characteristic as in Example 1.

EXAMPLE 4

A coating material was obtained in the same method as in Example 1 except that a water suspension contained 100 g of the green pigment $TiO_2$-ZnO-CoO-$Al_2O_3$, 5 Kg of ZnS:Cu·Al phosphor, 10 g of gelatin and 10 g of Uloid. The coating material was flow-dried at 170° C. to obtain a pigment-attached phosphor. The pigment-attached phosphor revealed the same good characteristic as in Example 1.

EXAMPLE 5

A coating material was obtained in the same method as in Example 1 except that a water suspension contained 6 g of the red pigment red iron oxide, 5 Kg of $Y_2O_2S:Eu$, 3 g of gelatin and 1 g of Uloid. The coating material was flow-dried at 190° C. to obtain a pigment-attached phosphor. The pigment-attached phosphor revealed the same good characteristic as in Example 1.

EXAMPLE 6

A pigment-attached phosphor was obtained in the same method as in Example 1 except that a water suspension contained 10 g of the red pigment red iron oxide, 5 Kg of $Y_2O_3:Eu$, 3 g of gelatin and 1 g of Uloid. The pigment-attached phosphor revealed the same good characteristic as in Example 1.

EXAMPLE 7

A pigment-attached phosphor was obtained in the same method as in Example 1 except that a water suspension contained 75 g of the blue pigment ultramarine blue, 5 Kg of ZnS:Ag phosphor, 40 g of gelatin and 5 Kg of Uloid. The pigment-attached phosphor thus obtained manifested the same good characteristic as in Example 1.

EXAMPLE 8

A pigment-attached phosphor was obtained in the same method as in Example 1 except that water suspension contained 75 g of the green pigment cobalt green, 5 kg of ZnS:Cu, Al phosphor, 30 g of gelatin and 20 g of Uloid. The pigment-attached phosphor obtained revealed the same good characteristic as in Example 1.

EXAMPLE 9

A pigment-attached phosphor was obtained in the same was as in Example 1 except that a water suspension contained 7.5 g of yellow iron oxide, 5 Kg of $Y_2O_2S:Eu$ phosphor, 4 g of gelatin and 1 g of Uloid. The pigment-attached phosphor thus obtained revealed the same good characteristic as in Example 1.

EXAMPLE 10

A water suspension was prepared from 100 g of the pigment cobalt blue, 5 Kg of ZnS:Ag blue phosphor, 10 g of gelatin and 5 g of Uloid. 5 g of potassium silicate and 1 g of $H_3PO_4$ based on a 100% $H_3PO_4$ solution concentration are added to the water suspension, with $ZnSO_4$ and $MgSO_4$ added thereto, Zn and Mg being 500 ppm and 100 ppm, respectively, against the weight of the phosphor. The water suspension thus obtained was adjusted with $NH_4OH$ to a pH of 7.0 and a coating material was separated, washed with water and flow-dried at 180° C. to obtain a pigment-attached phosphor. The pigment-attached phosphor thus obtained revealed the same good characteristic as in Example 1.

What is claimed is:

1. A pigment-attached phosphor whose pigment particles are attached to the surfaces of phosphor particles by gelatin and urea resin, 0.01 to 1.0 parts by weight of gelatin and 0.01 to 0.5 parts by weight of urea resin being added to 100 parts by weight of phosphor, the weight ratio of the gelatin and urea resin being within a range of 1:1 to 10:1.

2. A pigment-attached phosphor according to claim 1, wherein the weight of said gelatin is 0.05 to 0.80 parts by weight against 100 parts by weight of said phosphor.

3. A pigment-attached phosphor according to claim 1, wherein the weight of said urea resin is 0.02 to 0.04 parts by weight against 100 parts by weight of said phosphor.

4. A pigment-attached phosphor according to claim 1, wherein the weight ratio of said gelatin and said urea resin is 1:1 to 8:1.

5. A pigment-attached phosphor according to claim 1, wherein said pigment is at least one blue pigment selected from the group consisting of ultramarine blue, $2(Al_2Na_2Si_3O_{10})Na_2S_4$ and cobalt blue.

6. A pigment-attached phosphor according to claim 1, wherein said pigment is at least one green pigment selected from the group consisting of cobalt green and titanium green.

7. A pigment-attached phosphor according to claim 1, wherein said pigment is a red pigment selected from the group consisting of red iron oxide and yellow iron oxide or a yellow pigment which turns red upon sintering.

8. A pigment-attached phosphor according to claim 1, wherein said gelatin is at least one member selected from the group consisting of an alkali-treated gelatin, acid-treated gelatin and glue.

9. A pigment-attached phosphor according to claim 1, wherein said urea resin is a urea resin emulsion or a co-condensate emulsion selected from the group consisting of urea-melamine, urea-phenol and urea-melamine-phenol.

10. A pigment-attached phosphor according to claim 1, wherein said phosphor particles have a particle size of 2 to 14 µm and said pigment particles have a particle size of 0.01 to 1 µm.

11. A pigment-attached phosphor according to claim 1, further comprising at least one additive to enhance cohesion of the gelatin, urea resin and pigment particles to the surface of the phosphor particles, said additive selected from the group consisting of potassium silicate, colloidal silica, $PO_4$, an al compound, a Zn compound and an Mg compound.

* * * * *